US012640406B2

(12) United States Patent
Hwang et al.

(10) Patent No.: US 12,640,406 B2
(45) Date of Patent: May 26, 2026

(54) APPARATUS FOR SETTING COMMUNICATION ID OF ENERGY STORAGE SYSTEM

(71) Applicant: HANWHA SOLUTIONS CORPORATION, Seoul (KR)

(72) Inventors: Ui Seon Hwang, Seoul (KR); Jun Hong Min, Seoul (KR)

(73) Assignee: Hanwha Solutions Corporation, Seoul (KR)

( * ) Notice: Subject to any disclaimer, the term of this patent is extended or adjusted under 35 U.S.C. 154(b) by 437 days.

(21) Appl. No.: 18/256,501

(22) PCT Filed: Nov. 18, 2021

(86) PCT No.: PCT/KR2021/016954
§ 371 (c)(1),
(2) Date: Jun. 8, 2023

(87) PCT Pub. No.: WO2022/131587
PCT Pub. Date: Jun. 23, 2022

(65) Prior Publication Data
US 2024/0097212 A1      Mar. 21, 2024

(30) Foreign Application Priority Data

Dec. 15, 2020    (KR) ........................ 10-2020-0175475

(51) Int. Cl.
*H01M 10/42*           (2006.01)

(52) U.S. Cl.
CPC .. *H01M 10/425* (2013.01); *H01M 2010/4271* (2013.01); *H01M 2010/4278* (2013.01)

(58) Field of Classification Search
CPC ........... H01M 10/425; H01M 10/4257; H01M 2010/4271; H01M 2010/4278
See application file for complete search history.

(56) References Cited

U.S. PATENT DOCUMENTS

2014/0347013 A1* 11/2014 Kim .................... G01R 31/382
                                                    320/134
2020/0351349 A1   11/2020 Nam et al.
2021/0309121 A1* 10/2021 Jain ....................... B60L 53/305

FOREIGN PATENT DOCUMENTS

FR            3067878 A1    12/2018
JP        2005-339424 A    12/2005
(Continued)

OTHER PUBLICATIONS

Extended European Search Report dated Nov. 11, 2024 issued in corresponding European Patent Appln. No. 21906892.1.
(Continued)

*Primary Examiner* — Christopher P Domone
(74) *Attorney, Agent, or Firm* — Harness, Dickey & Pierce, P.L.C.

(57)           ABSTRACT

The present invention relates to an apparatus for setting a communication ID of an energy storage system, the apparatus comprising: a power converter for selecting one power line from among a plurality of power lines to supply power through the selected power line; and battery managers which are sequentially connected to the power converter and are operated by the power selectively supplied through the one power line selected from among the plurality of power lines, wherein the power converter may communicate with one battery manager which is operated by the supplied power from among the battery managers.

4 Claims, 3 Drawing Sheets

(56)          References Cited

FOREIGN PATENT DOCUMENTS

| KR | 10-2014-0084453 | A  | 7/2014 |
| KR | 10-2016-0143092 | A  | 12/2016 |
| KR | 101904902 | B1 | 10/2018 |
| KR | 101926195 | B1 | 2/2019 |
| KR | 10-2020-0038817 | A  | 4/2020 |

OTHER PUBLICATIONS

International Search Report for International Application No. PCT/
KR2021/016954 dated Feb. 18, 2022.

* cited by examiner

APPARATUS FOR SETTING COMMUNICATION ID OF ENERGY STORAGE SYSTEM

CROSS-REFERENCE TO RELATED APPLICATIONS

This application is a national phase under 35 U.S.C. § 371 of PCT International Application No. PCT/KR2021/016954 which has an International filing date of Nov. 18, 2021, which claims priority to Korean Patent Application No. 10-2020-0175475, filed Dec. 15, 2020, the entire contents of each of which are hereby incorporated by reference.

TECHNICAL FIELD

The present invention relates to an apparatus for setting a communication ID of an energy storage system, and more particularly, to an apparatus capable of automatically setting a communication ID for each battery.

BACKGROUND

An energy storage system (ESS) is applied to new and renewable energy generation where the amount of charge is not constant, and plays a role to store generated surplus power and to supplement when the amount of power generation is insufficient compared to the amount of power at the load end.

An ESS usually uses lithium-ion batteries connected in parallel, and a battery management system is applied to each battery to detect the state of the battery and communicate with a higher level power conditioning system.

In general, a battery management system (BMS) receives power from a power conditioning system and operates and is connected to a power line receiving the power and a communication line for communication.

That is, each of the plurality of batteries needs to be wired into the power conditioning system and a communication line and a power line, and when the ESS is installed, a worker needs to connect each of the wires.

In addition, the communication ID needs to be manually set using a communication ID setting switch provided in each of the battery management systems.

If a worker accidentally mis-set the communication ID during the process of setting the communication ID, a communication error may occur, and in order to solve the error, each battery management system needs to be checked again, and thus, there was a problem in that time and cost may be lost.

FIG. 1 illustrates a structure of wiring and communication ID setting of a conventional ESS.

Referring to FIG. 1, a battery parallel wired structure of a conventional ESS represents a connection structure between a power conditioning system 100 and power lines and communication lines of a plurality of battery management systems 200.

The power conditioning system 100 includes a power supply 110 for supplying power of a PV or a power grid to the plurality of battery management systems 200, and a master communicator 120 for communication with each battery management system 200.

In addition, each of the plurality of battery management systems 200 includes a power 210 receiving power from the power supply 110 through a parallel power line 300, a slave communicator 220 connected to the master communicator 120 through a parallel communication line 400 and providing information such as a state of a battery, and a switch 230 for setting an ID of the slave communicator 220.

A conventional wiring method of such a structure will be described in more detail.

The power conditioning system 100 is a system for converting DC/DC between the PV and a battery 500 or AC/DC power between the power grid and the battery 500, and includes a power supply 110 for supplying power to each battery management system 200 as described above.

The power of the power supply 110 is supplied to the power 210 of the battery management system 200, which manages the battery 500 of each storage device through the parallel power line 300.

In addition, the power conditioning system 100 may perform wired communication with the slave communicators 220 of the battery management system 200 through the master communicator 120 to identify state information of the battery 500, and for this, the parallel communication line 400 is wired between the master communicator 120 and the slave communicator 220.

In this case, a worker operates the switch 230 to set an ID of each slave communicator 220.

As many parallel communication lines 400 as the number of battery management systems 200 are required between the power conditioning system 100 and the battery management system 200, and a worker needs to wire each parallel communication line 400.

That is, a lot of work time is required, and the complexity of the work further increases when the distance between the power conditioning system 100 and the battery management system 200 is long or the number of battery management systems 200 is large.

Therefore, erroneous wiring frequently occurs by workers, and products may be damaged or errors may occur due to erroneous wiring.

In addition, when a communication error occurs after work, a task for finding the cause and solving the error becomes a very difficult and complicated task.

In particular, if a worker sets IDs of two or more battery management systems 200 identically, normal operation cannot be performed, and there was a problem in that switch states of a plurality of battery management systems 200 need to be checked again to find the cause.

In addition, there is a problem in that the relative size of the product increases due to the addition of the switch, or difficulties may occur in attaching and operating the switch due to a narrow space.

SUMMARY

Technical Problem

In order to solve the above problems, the present invention is directed to providing an apparatus for setting a communication ID for an energy storage system that can automatically set an ID without using a switch.

Technical Solution

The apparatus for setting a communication ID of an energy storage system of the present invention for solving the above problem includes a power converter for selecting one power line from among a plurality of power lines to supply power through the selected power line; and battery managers which are sequentially connected to the power converter and are operated by the power selectively supplied through the one power line selected from among the plurality of power lines, wherein the power converter may communicate with one battery manager which is operated by the supplied power from among the battery managers.

In an embodiment of the present invention, the power converter may include a power supply for supplying power; a selector for selecting one of the plurality of power lines connected to a power output port of the power converter and output the power of the power supply; and a master communicator for communicating with a battery manager selected by the selector and supplied with power.

In an embodiment of the present invention, the power converter may control switching of a plurality of switches constituting the selector and process data received through the master communicator by matching it with the battery manager that is supplied with power and operated.

In an embodiment of the present invention, the selector may include the plurality of switches having one end connected to one of a first power line and a second power line from which power is output from the power supply, and sub power lines connecting the other end of each of the plurality of switches and the battery manager.

Advantageous Effects

The present invention provides a power conditioning system to selectively supply power to battery management systems and communicate with the battery management system to which power is supplied, thereby enabling communication without setting a separate communication ID, thereby preventing communication errors caused by an ID setting error.

According to the present invention, since a communication ID is set by using a selective power supply and a setting of an ID according to the selective power supply without manually setting a communication ID by a worker, a configuration of a switch that needs to be installed for each battery management system can be omitted, and thus a hardware configuration can be simplified, a size of an apparatus can be reduced, and a cost can be reduced, and a system installation operation can be simplified, and thus time and cost can be reduced.

---

<Description of Symbols>

| | |
|---|---|
| 10: power converter | 11: power supply |
| 12: selector | 13: master communicator |
| 20, 30, 40: battery manager | 21, 31, 41: power |
| 22, 32, 42: slave communicator | |

---

DETAILED DESCRIPTION OF THE EMBODIMENTS

Hereinafter, in order to fully understand the configuration and effects of the present invention, preferred embodiments of the present invention will be described with reference to the accompanying drawings. However, the present invention is not limited to the embodiments disclosed below, and may be embodied in various forms and various modifications may be made. Rather, the description of the present invention is provided so that the present disclosure will be thorough and complete and will fully convey the scope of the invention to those of ordinary skill in the art. In the accompanying drawings, the size of the elements is enlarged compared to actual ones for the convenience of description, and the ratio of each element may be exaggerated or reduced.

Terms such as 'first' and 'second' may be used to describe various elements, but, the above elements should not be limited by the terms above. The above terms may be used only for the purpose of distinguishing one element from another. For example, without departing from the scope of the present invention, a 'first element' may be named a 'second element' and similarly, a 'second element' may also be named a 'first element.' In addition, expressions in the singular include plural expressions unless explicitly expressed otherwise in the context. Unless otherwise defined, terms used in the embodiments of the present invention may be interpreted as meanings commonly known to those of ordinary skill in the art.

Figure 1:
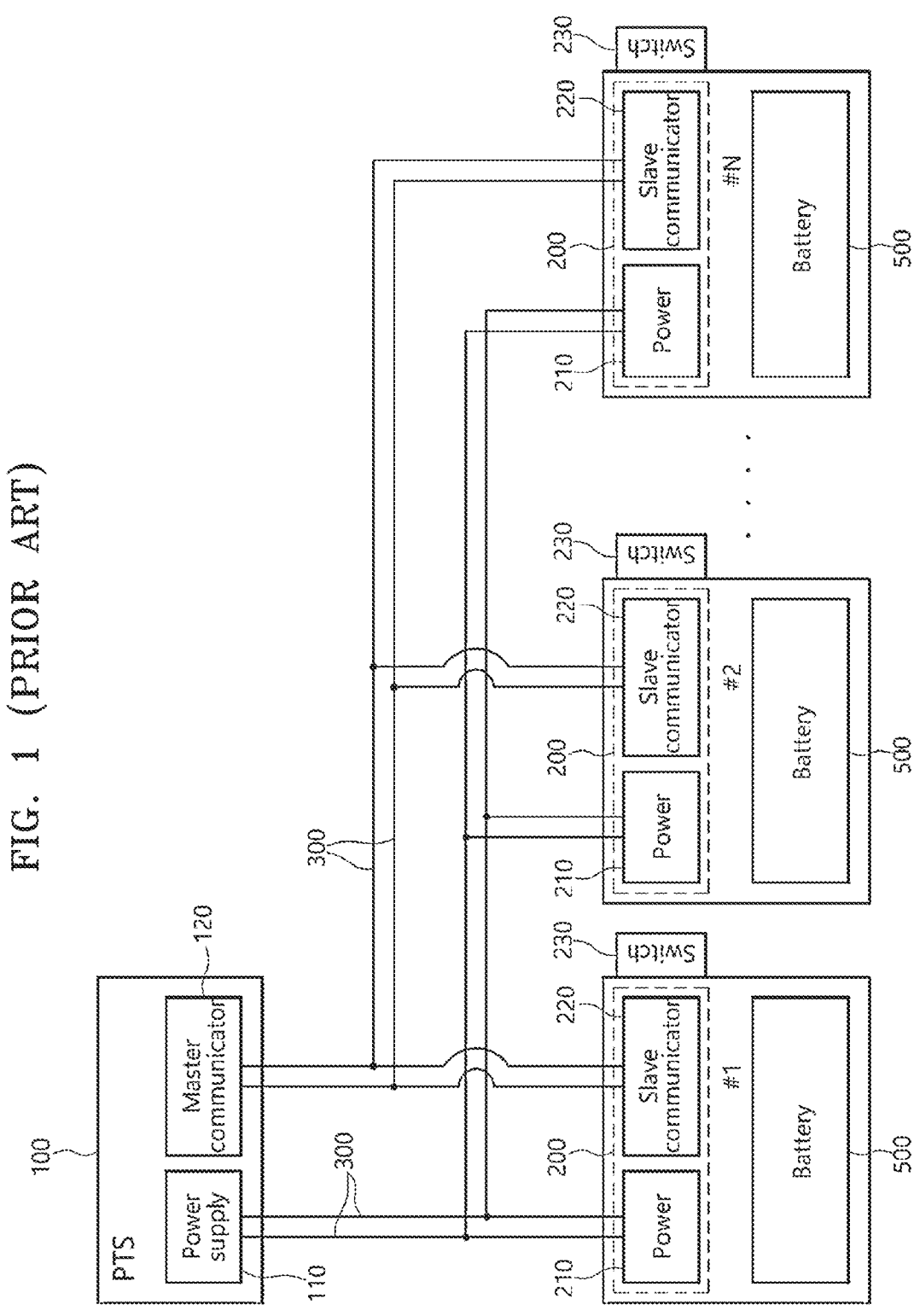
FIG. 1 is a structure diagram of wiring and communication ID setting of a conventional energy storage system.
Figure 2:
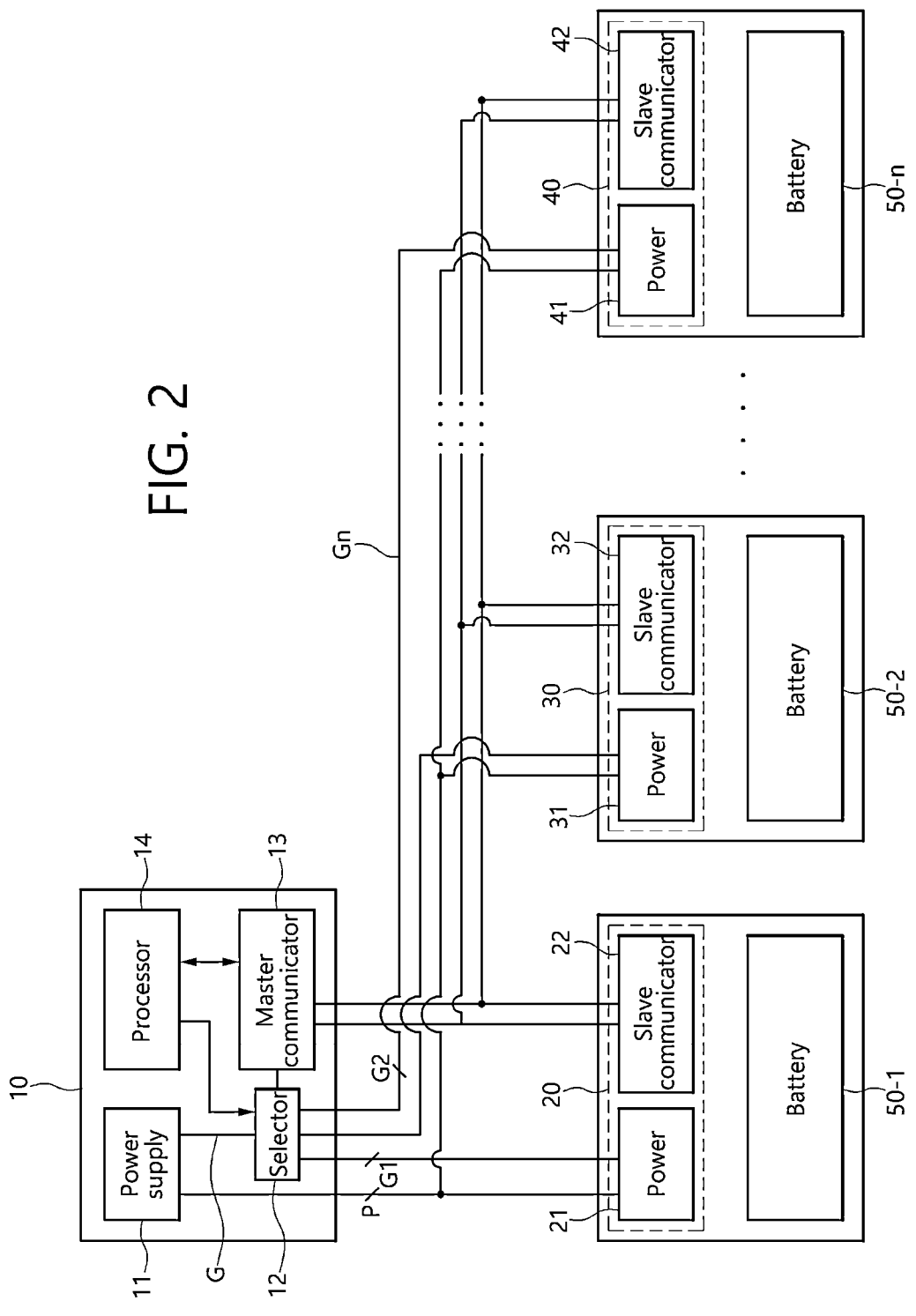
FIG. 2 is a block diagram of an apparatus for setting a communication ID of an energy storage system according to a preferred embodiment of the present invention.

FIG. 2 is a block diagram of an apparatus for setting a communication ID of an energy storage system according to a preferred embodiment of the present invention.

Referring to FIG. 2, the apparatus for setting a communication ID of an energy storage system according to a preferred embodiment of the present invention selectively supplies power to each of the battery managers 20, 30, 40 by using power lines P, G1 to Gn as many as the number of battery managers 20, 30, 40, which are slave devices, from the power converter 10 which is the master device.

The number of battery managers 20, 30, 40 is arbitrarily determined according to the size of the energy storage system, and three battery managers 20, 30, 40 are shown and described in the present invention for convenience of description.

Thereafter, the battery manager 20 may be described as a first battery manager 20, the battery manager 30 may be described as a second battery manager 30, and the battery manager 40 may be described as a last battery manager 40.

The configurations of the battery managers 20, 30, 40 are the same, and each include a power 21, 31, and 41, and each include a slave communicator 22, 32, and 42 for communication with the power converter 10.

Each of the slave communicators 22, 32, and 42 of the battery managers 20, 30, and 40 transmits state information of the assigned batteries 50-1 to 50-$n$.

A more detailed description of such a configuration is as follows.

The power converter 10 includes a power supply 11 for supplying power to each of the battery managers 20, 30, and 40, and a master communicator 13 for communication with the battery managers 20, 30, and 40.

The power supply 11 may supply DC power through a positive electrode line P and a negative electrode line G.

The positive electrode line P of the power supply 11 is connected in parallel to the powers 21, 31, and 41 of all the battery managers 20, 30, and 40, and the negative electrode line G is divided into a plurality of negative electrode lines G1 to Gn through the selector 12, respectively, and is connected in series to the power supplies 21, 31, and 41.

Figure 3:
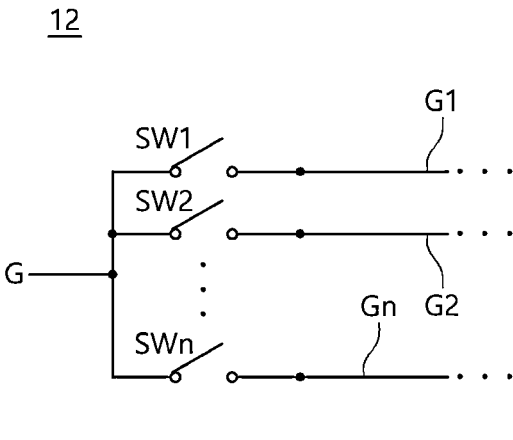
FIG. 3 is a configuration diagram of one implementation of a selector.

FIG. 3 is a configuration diagram of the selector 12.

The selector 12 includes a plurality of switches SW1 to SWn having one end connected to the negative electrode line G of the power supply 11.

In the above, n is a positive integer.

The other ends of the switches SW1 to SWn may be connected to one end of sub negative electrode lines G1 to Gn, respectively, and power may be supplied to the powers 21, 31, and 41 of the battery managers 20, 30, and 40 through the sub negative electrode lines G1 to Gn selected according to the states of the switches SW1 to SWn.

The switching of the switches SW1 to SWn is performed by the control of a processor 14.

The switches SW1 to SWn may be transistors.

Describing a specific operation, 1, the processor 14 of the power converter 10 controls the selector 12 to close the switch SW1 and keep the remaining switches SW2 to SWn open during an initial operation in a state in which instal-lation such as wiring is completed.

In this case, the processor 14 may specify the battery manager 20 to which the power of the power supply 11 is supplied as the switch SW1 is closed.

As the switch SW1 is closed, power from the power supply 11 is supplied to the power 21 of the battery manager 20 in a state in which both the positive electrode line P and the negative electrode line G are connected thereto.

The battery manager 20 may operate according to the supply of power and detect the state of the battery 50-1.

Although not shown in the drawings, the battery manger 20 may check the state of the battery 50-1 by using infor-mation obtained from the sensors, including various sensors and processors.

Such configuration is commonly applied to all the battery managers 30 and 40.

The processor 14 of the power converter 10 may transmit a request for checking the state of the battery by using the master communicator 13.

In this case, the request is not specific to the battery manager 20, 30, or 40, which is the receiving side.

That is, a request that does not include the ID of the receiving side is transmitted.

Among the power supplies 21, 31, and 41 of each battery manager 20, 30, and 40, power is currently supplied from the power supply 11 to the power 21 of the first battery manager 20, and thus, only the first battery manager 20 is the battery manager that is operated.

Therefore, the slave communicator 22 of the battery manager 20 may receive a request from the master commu-nicator 13.

The battery manager 20 that has received the request of the master communicator 13 transmits information such as the state of the battery 50-1.

The slave communicator 22 of the battery manager 20 transmits data representing the battery state in a state in which its own ID is not set and the ID of the master communicator 13, which is the receiving side, is not set either.

This data is received by the master communicator 13, and in this case, the processor 14 may match the received battery information with the battery manager 20 that is currently supplied with power and operates.

The matched information may be stored in an internal or external memory of the processor.

Then, the processor 14 of the power converter 10 opens the switch SW1 of the selector 12 and closes the second switch SW2 to allow power from the power supply 11 to be supplied to the second battery manager 30.

Then, the processor 14 transmits a signal for requesting transmission of the state information through the master communicator 13, which is received by the slave communicator 32 of the second battery manager 30, which is currently supplied with power and operates.

The slave communicator 32 that received the request for transmission transmits the state information of the battery 50-2, which may be received by the master communicator 13 and matched with the battery manager 30, which is currently supplied with power, and stored.

This stored information can be used for balancing control that equalizes the state of charge of each battery.

As such, the processor 14 selectively sequentially controls the switches of the selector 12 to allow power to be supplied to only one battery manager and communicates with the powered battery manager, so that a separate ID setting is not required.

The control of the selector 12 of the processor 14 is sequentially repeated to close the last switch SWn and open all other switches SW1 to SWn-1 so that power is supplied to the last battery manager 40.

Then, as described above, transmission of battery state information is requested.

The request is received by the slave communicator 42 of the battery manager 40, which operates according to the supply of power, and the slave communicator 42 transmits information confirming the state of the battery 50-n.

The data transmitted by the slave communicator 42 is received by the master communicator 13 and matched with the battery manager 40 and stored.

Therefore, the present invention can perform individual communication without setting the IDs of all the battery managers 20, 30 and 40.

While embodiments according to the present invention have been described above, but these are only exemplary, and those of ordinary skill in the art may understand that various modifications and embodiments of equivalent scope are possible therefrom. Accordingly, the true technical pro-tection scope of the present invention shall be determined according to the attached claims.

INDUSTRIAL APPLICABILITY

The present invention proposes an apparatus capable of individual communication without using an ID of a battery manager of an energy storage system using natural laws, and has industrial applicability.

What is claimed is:

1. An apparatus for setting a communication ID, com-prising:
   a power converter for selecting one power line from among a plurality of power lines to supply power through the selected power line; and
   battery managers which are sequentially connected to the power converter and are operated by the power selec-tively supplied through the one power line selected from among the plurality of power lines,
   wherein the power converter is configured to communi-cate with one battery manager which is operated by the supplied power from among the battery managers.

2. The apparatus for setting the communication ID of claim 1, wherein the power converter comprises:
   a power supply for supplying power;
   a selector for selecting one of the plurality of power lines connected to a power output port of the power con-verter and output the power of the power supply; and
   a master communicator for communicating with a battery manager selected by the selector and supplied with power.

3. The apparatus for setting the communication ID of claim 2, wherein the power converter is configured to control switching of a plurality of switches constituting the selector and process data received through the master communicator by matching it with the battery manager that is supplied with power and operated.

4. The apparatus for setting the communication ID of claim 3, wherein the selector comprises the plurality of switches having one end connected to one of a first power line and a second power line from which power is output from the power supply, and sub power lines connecting the other end of each of the plurality of switches and the battery manager.

\* \* \* \* \*